Dec. 3, 1929. H. A. DAVIES 1,738,360
ELECTRIC FLUID HEATING APPARATUS
Filed Sept. 12, 1928
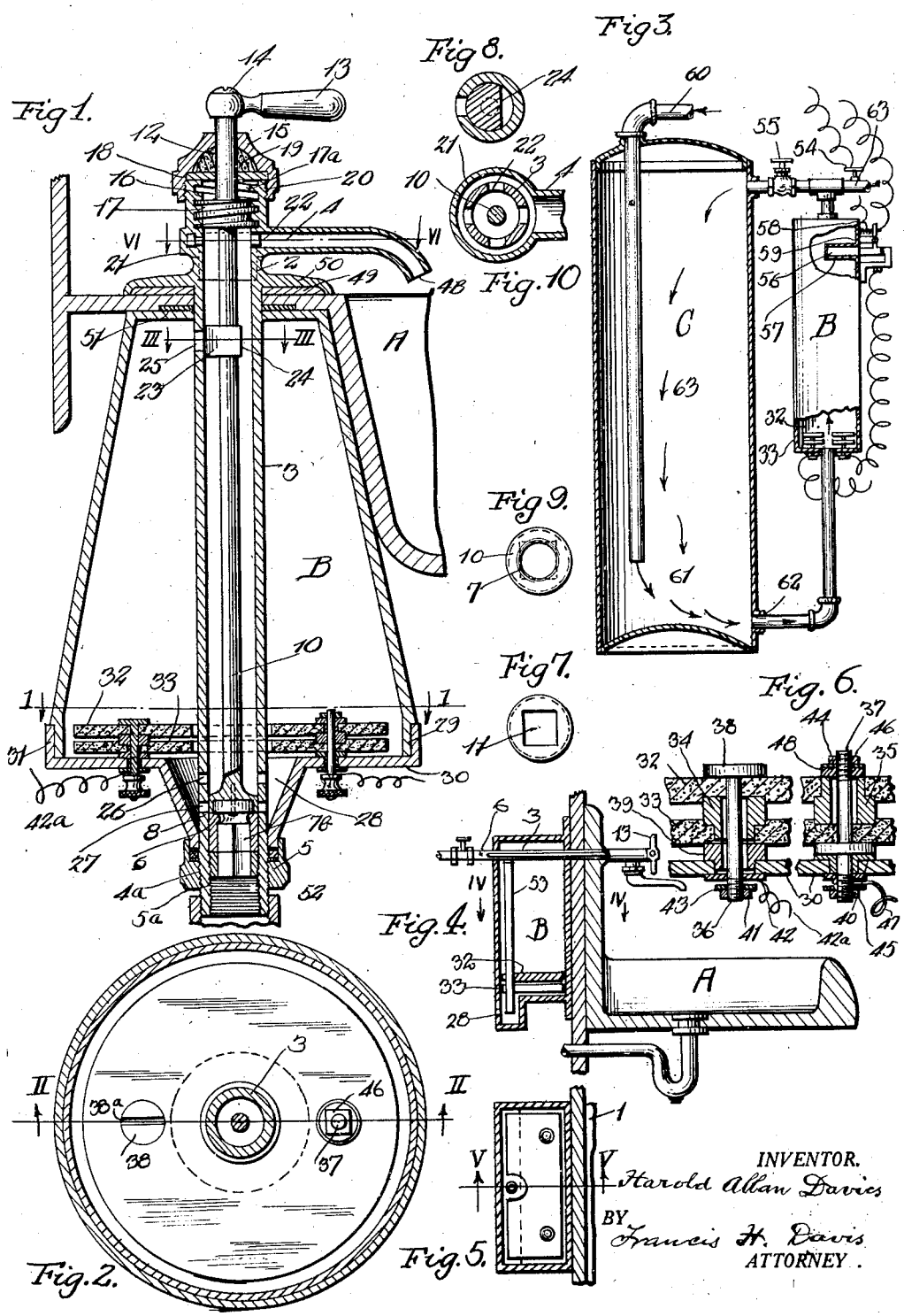
INVENTOR.
Harold Allan Davies
BY Francis H. Davis
ATTORNEY.

Patented Dec. 3, 1929

1,738,360

UNITED STATES PATENT OFFICE

HAROLD ALLAN DAVIES, OF ALAMEDA, CALIFORNIA

ELECTRIC FLUID-HEATING APPARATUS

Application filed September 12, 1928. Serial No. 305,424.

This invention relates to electric fluid-heating and has for its object to provide an automatic, self-discharging, water-heating apparatus; and furthermore, to provide an electrically-heatable, automatic, two-tank storage apparatus and system.

An object of the present invention is to interrelate between a supply main and a discharge outlet, a reservoir provided with electrical water-heating elements, and having simultaneously-operable means for the simultaneous admission of water and the expellance of trapped air from the reservoir.

Another object is to provide means whereby boiling water may be automatically ejected from the apparatus under its own pressure while communication with the main supply pipe is shut off.

A further object is to provide a sump element from which any sediment collected within said reservoir will be ejected with the boiling water, thus preventing impairment of the electrical element or the efficient functioning thereof.

Still another object is to provide means whereby incoming water from the main may be so regulatively retarded or accelerated in its passage through the heating reservoir as to deliver water at any desired degree of temperature to sinks, lavatories, wash-tubs or wherever required, and from a single outlet.

Another object of my invention is to supply a novel reservoir provided with novel electrode elements therein, the reservoir being adapted approximately to conform to the outline of a sink or lavatory so as to fit snuggly thereto, thus presenting a harmonious and pleasing design while affording a compact construction for conservation of space.

A further object is to provide a detachable base for said reservoir, the base carrying resistance electrode-elements and being provided with a sump below said elements.

A further object is to provide an apparatus of this kind, having two inter-communicating reservoirs, one large and one small, the smaller one being provided with electric heating elements and with means for the direct discharge of hot water therefrom for use when a relatively small quantity of water is required; and means for the inter-circulation of water between both reservoirs whereby the temperature of the water in the larger reservoir can be raised when greater quantities of hot water are required.

An additional object is to provide a thermostatic control for the regulation of electric energy in relation to said apparatus.

My invention has many other novel and useful objects which will be more fully described in connection with the accompanying drawings, and more fully pointed out in and by the appended claims.

Without desiring to limit myself to the precise details illustrated, I have shown three preferred embodiments of my invention in the accompanying drawings, in which:

Figure 1 is a vertical section through one form of my improved apparatus, taken on the line II—II of Fig. 2.

Fig. 2 is a plan view taken on the line I—I of Fig. 1.

Fig. 3 is a diagrammatic, vertically-elevational and partly sectional view of my invention when embodied in a two-reservoir apparatus, the second form of my invention.

Fig. 4 is a diagrammatic, sectional elevation of the third form of my invention, taken on the line V—V of Fig. 5.

Fig. 5 is a partially diagrammatic, cross-section taken on the line IV—IV of Fig. 4.

Fig. 6 is a detached, enlarged, broken, sectional-elevational view of the details of the electrical heating elements and insulations as they would appear on the line II—II of Fig. 2.

Fig. 7 shows an end view of the socketed lock-member.

Fig. 8 is a cross-section taken on the line III—III of Fig. 1.

Fig. 9 is a top view of the valve seat.

Fig. 10 is a cross-sectional view taken on the line VI—VI of Fig. 1.

Similar reference characters refer to similar parts throughout the several views.

I have illustrated my invention in Figs. 1 and 2 as applied to a lavatory or sink A, to the under-structure of which the reservoir B is attached by means of the supporting-duct 3, said duct being provided at the upper end with the faucet or cock 4 which may be formed integral therewith or be removably attached to the duct by the inter-engaging screw-threading 2. The lower end of said duct is screw-threaded externally at 4ᵃ for a suitable distance to afford axial adjustment thereon for the supporting-nut 5; the screw-threading 5ᵃ being provided internally of the duct 3 to accommodate and afford axial adjustment for the inter-engaging valve seat 6. The seat 6 being preferably provided with a square socketed opening 7 on the lower portion thereof (indicated by dotted lines in Fig. 9) for engagement with a turnkey means with which to attain accurate adjustment of said seat with relation to the valve 8 by means of right or left manipulation of said seat, the upper portion of which is ring-like with preferably rounded edges the better to engage with the valve 8 for water-tight connection.

The lock-member 9 is threaded externally for inter-engagement with the internal thread 5ᵃ, is faced off true above and below in horizontal planes and provided with a central axial perforation 11 of irregular outline and adapted for inter-engagement with a turn-key or other suitable means for locking said member in fixed relation to the lower end of said valve seat.

The valve 8 is carried by the lower end of the valve-stem 10, said stem per se (as well shown in Fig. 1) is centrally disposed within the duct 3 and extends upwardly from the valve seat 6 through the entire apparatus, being provided on the upper end with the handle 13 suitably and removably secured thereto by means of the screw 14. The portion 12 of the stem 10 is of round section and extends downwardly through the packing nut 15 to the threaded portion 16. Said portion being of larger diameter than the stem 10 and of a suitable length to afford space for the quick-acting square thread 17 chased thereon. Said threaded portion 16 engages its counterpart thread 17ᵃ in the upper part of the faucet 4, which threaded portion is sufficiently longer than the portion 16 so as to allow the stem 10 adequate up and down adjustment between the valve seat 6 and the washer 18, which washer may be of metal or other suitable material and is adapted to seat up into the packing nut 15 and compress the packing material 19 so as to effect a water-tight joint when said nut is screwed down into the faucet 4 by the inter-engaging thread 20.

The hooded portion 21 which extends about the lower part of the faucet 4 (as well shown in elevation in Fig. 1 and in plan in Fig. 10) forms an annular space round the extension of the duct 3 formed by the lower part of said faucet, the series of ports 22 establishing free communication at all times between the duct 3 and the atmosphere thereby obviating any liability to explosion of the apparatus due to pent steam.

Now, within the duct 3 at a level just below the interior upper end of the reservoir B, the stem 10 is suitably provided with the valve-element (well shown in Figs. 1 and 8) comprising the cylindrical portion 23 and the flat portion 24, adapted respectively to close or to open the port 25 accordingly as the valve 8 is correspondingly closed or open, for a purpose to be explained.

Adjacently above the valve 8, when seated, the duct 3 is provided with the perforations 27, and with the perforations 26 which are disposed at a level slightly above said valve 8, thus establishing open communication for fluid passage therethrough from the interior of the reservoir B, on up said duct, through the ports 22 and out to the atmosphere through the faucet opening 4ᵇ; said seat 6, valve 8 and the perforations 27 and 26 all being disposed at a level well within the sump 28 and below said electrodes by which means said sump and electrodes are washed clean and free of sediment every time boiling water is expelled from the reservoir B.

The body of the reservoir B is preferably a hollow truncated cone, although I do not wish to be restricted to that particular shape. The upper part of said reservoir is closed and finished on the top to fit the under-structure of the sink A, however, said upper end is centrally perforated for the downward passage therethrough of the duct 3. At a level adjacent its lower end the outline of said reservoir breaks vertically for a suitable distance in order to have formed on it the screw-threadings 29 for inter-engagement with those of the base 30, said base being of circular outline, having the upwardly flanged rim 31 which is internally threaded for inter-engagement with the threads 29 whereby solid abutment is had against the bottom of the reservoir B.

The inner surface of said base is plane save that the preferably inwardly tapering sump 28 extends downwardly from the center thereof. The extreme lower end of said sump being bored to slip over the duct 3 and has the corresponding outer-surface turned down parallel to fit the recessed end 5ᵇ of the supporting-nut 5.

*The electrical elements*

Attached to the inner side of the base and disposed horizontally therewith are the two disc-like electrode elements 32ˣ and 33 (preferably of carbon) said elements being centrally perforated for admission therethrough, without contacting therewith, of the duct 3 and also suitably counter-bored and drilled respectively to receive the insulating elements 34 and 35 and the binding-post members 36 and 37, well shown in Figs. 2 and 6; said insulatory elements being preferably of porcelain and the post of brass. Post 36 has a flat head 38 that contacts with the upper surface of the electrode 32, as does the post itself with respect to that part of its length which passes therethrough.

Now, by reference to Fig. 6 the base 30 is suitably drilled to receive the shouldered insulatory elements 39 and 40 respectively. The post 36 has a straight shank suitably threaded to match the binding-nut 41, said shank passes freely through the elements 34 and 39 and is of sufficient length to accommodate the insulatory washer 42, outside said base, and an electric wire 42$^a$ secured by the washer 43, and said nut 41, the tightening of which binds the left-hand sides of said electrodes firmly to the base 30.

The post 37 has a suitably disposed, right-cylindrical boss 44 formed thereon and is screw-threaded at both ends to match the binding nuts 45 and 46. The lower shank of said post carries the electric wire 47 which supplies electric current to the boss 44 contacting with the electrode 33, whereas the upper shank thereof after leaving said electrode extends freely upwardly through the element 35 with sufficient extension thereabove to accommodate the insulatory washer 48 and the binding nut 46. Obviously, the tightening of said nuts 41, 45 and 46 will firmly secure the electrode elements with their respective lead wires 42$^a$ and 47 to the base 30 in such manner that whenever said electrodes are submerged in water a highly resistant electrical circuit will be established which will be very efficient for the heating of water either contained in said reservoir or that may be passing therethrough at a regulated rate of speed under control of the valve 8.

The apparatus is assembled by first securing the electrodes to the base 30 in the manner described, then the duct member 3 including said valve and seat members properly adjusted therein is passed downwardly through a hole in the supporting structure A until the upper packing washer 49 contacts between the upper surface of the structure and the under recess of the flange 50, then the lower packing washer 51 is slipped on said duct and the reservoir B then pushed on as far as it will go, whereupon the supporting-nut 5 is interengaged with the screw-threading 4$^a$ and screwed up tight, which has the effect of fastening the reservoir B firmly in position. Water may now be served through the coupling connection 52, after which, when the wire leads 42$^a$ and 47 are suitably connected with a source of electric energy the apparatus is ready for operation.

From the position shown in Fig. 1 a movement of the handle 13 in a counter-clockwise direction produces these effects: It raises the valve 8 off the seat 6, exposes the perforations 27 which admits water to the sump and also opens the port 25 by turning the cylindrical portion 23 away therefrom and presenting the flat 24 thereto. As the water rises in the reservoir B the air which would otherwise be trapped in said reservoir and render my invention inoperative, now escapes through the port 25 which is free to the atmosphere by way of the ports 22 and the faucet aperture 4$^b$. Cold water will now flow, but if boiling water is needed the handle 13 must be turned clockwise to shut the water off. The electrodes being now energized the water contained in the reservoir is in a few moments raised to boiling point and automatically discharges itself by the steam pressure generated in said reservoir forcing the water out of said reservoir through the ports 26, thence up to duct 3 and out through the aperture 4$^b$. Should merely warm water be required it may be obtained by regulation of the handle 13 in either direction.

The second embodiment of my invention I illustrate in Fig. 4 as applied to a kitchen sink with the duct 3 disposed horizontally and having the down-pipe 53 leading to the sump 28, the operation of which is similar to that above described relative to the first embodiment.

In the third embodiment, well shown in Fig. 3, my heating apparatus B is shown interrelated with a secondary reservoir C of larger dimensions. By use of this apparatus and the arrangement thereof small quantities of hot water may be obtained direct from the reservoir B by opening the outlet valve 54 and by closing the valve 55. In this embodiment the electric circuit energizing the electrodes 32 and 33 is controlled, not by the presence of water closing the circuit when heat is required, but by use of the conventional thermostatic element too well known to need full description, wherein a carbon electrode 56 incased loosely within a copper tube 57 operates a switch by expansion and contraction of said tube, adjustment being had to make and break circuit at a given temperature by the spring 58 rocking a pole-piece 59.

As shown, cold water is admitted to reservoir C by the supply pipe 60 following the direction of the arrow 61 whenever the valve 55 is closed, being directly admitted to the reservoir B from beneath by the pipe 62, in which case the content of reservoir B only, will be heated instead of simultaneously heating the water contained in both said reservoirs B and C, but whenever larger quantities of hot water are needed the water heated in reservoir B may be made to circulate in the path indicated by the arrows 63 by opening the valve 55.

It is believed that the construction, operation and advantages of the present invention will now be clearly understood. The three embodiments of the invention have been disclosed in detail by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. In an apparatus of the kind described having a supply pipe, a controlling faucet and support means therefor, a closed reservoir containing electrical heating elements suitably wired for connection with a source of electrical energy, a central duct passing downwardly through the reservoir establishing fluid connection between said supply, the said reservoir and the faucet, a valve to control the flow of fluid through the duct, perforate means in the duct admitting fluid to the reservoir, perforate means to return fluid from the reservoir to the duct and a controlled vent means adapted to liberate trapped air from the reservoir to the duct.

2. In an apparatus as set forth in claim 1, a reservoir having a base removably attached thereto, a sump extending downwardly from said base, said sump being bored to slip on the lower end of said duct, said end being suitably threaded for interengagement of a supporting nut adapted to secure the reservoir to the support means either with or without gasket means for water tight connection.

3. In an apparatus comprising the elements recited in claim 1, having a sump element extending downwardly from the reservoir base, having a duct traversing downwardly through the sump, an admission valve element carried by the duct, perforate means in the duct adjacent said valve and perforate means in said duct adjacently above the valve, the valve and the perforations being all disposed at a level below said reservoir and heating elements.

4. An apparatus of the kind described comprising a supply pipe, a controlling faucet and support means therefor, a closed reservoir having a base, a central duct passing downwardly through the reservoir establishing fluid connection between said supply, reservoir and faucet, a valve adapted to control the flow of fluid through the duct, perforate means in the duct admitting fluid to the reservoir, perforate means to return fluid from the reservoir to the duct, a controlled vent means adapted to liberate trapped air from the reservoir to the duct, a plurality of flat electrodes disposed horizontally one above another on said base, insulating means between said electrodes, conducting binding posts attached between said insulating means and the base, and wire and switch-connections between the binding posts and the source of electrical supply.

5. In an apparatus as set forth in claim 1, having a duct member carrying an admission valve capable of depression and elevation by manual rotary manipulation from the outside, a valve seat complemental to said valve, said seat being externally threaded for inter-engagement with an internal thread of said duct whereby elevational adjustment of the seat is attained, said seat being followed by a lock-member similarly threaded, irregularly-shaped holes being provided in both the seat and the lock-member for turn-key manipulation thereof.

In testimony whereof I have set my hand to this specification this 30th day of August, 1928.

HAROLD ALLAN DAVIES.